(12) United States Patent
Isenhour et al.

(10) Patent No.: US 9,798,089 B2
(45) Date of Patent: Oct. 24, 2017

(54) FIBER OPTIC CONNECTOR ASSEMBLIES HAVING WINDOWED OPTICAL FIBERS AND METHODS THEREOF

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US); Reginald Roberts, Taylorsville, NC (US)

(73) Assignee: Corning Optical Communications LLC, Hickory, NC (US)

( * ) Notice: Subject to any disclaimer, the term of this patent is extended or adjusted under 35 U.S.C. 154(b) by 502 days.

(21) Appl. No.: 13/737,472

(22) Filed: Jan. 9, 2013

(65) Prior Publication Data
US 2014/0193119 A1     Jul. 10, 2014

(51) Int. Cl.
*G02B 6/36* (2006.01)
*G02B 6/38* (2006.01)
*G02B 6/245* (2006.01)

(52) U.S. Cl.
CPC ............ *G02B 6/36* (2013.01); *G02B 6/3887* (2013.01); *G02B 6/245* (2013.01); *Y10T 156/1043* (2015.01)

(58) Field of Classification Search
CPC .. G02B 6/3885; G02B 6/3839; G02B 6/3826; G02B 6/3833
See application file for complete search history.

(56) References Cited

U.S. PATENT DOCUMENTS

| 6,631,228 B2 | 10/2003 | Gao et al. ...................... 385/49 |
| 7,693,374 B2 | 4/2010 | Cody et al. ................... 385/100 |
| 7,712,970 B1 | 5/2010 | Lee ................................ 385/58 |
| 8,702,316 B2 | 4/2014 | Difonzo et al. |

(Continued)

FOREIGN PATENT DOCUMENTS

DE      4102459 A1    7/1992    ............... G02B 6/38

OTHER PUBLICATIONS

Patent Cooperation Treaty International Search Report, Application No. PCT/US2014/010794, Apr. 24, 2014, 4 pages.
(Continued)

*Primary Examiner* — Sung Pak
*Assistant Examiner* — Hoang Tran
(74) *Attorney, Agent, or Firm* — Michael E. Carroll, Jr.

(57) ABSTRACT

Fiber optic connector assemblies and method for assembling the same are disclosed. In one embodiment, a fiber optic connector assembly includes an optical fiber having an inner glass region, a polymer layer surrounding the inner glass region, and a windowed portion, wherein the inner glass region is exposed at the windowed portion. The fiber optic connector assembly further includes a connector body having a demarcation region at a first end, wherein the optical fiber is disposed within the connector body such that at least a portion of the windowed portion is positioned in the demarcation region, and the optical fiber is adhered to the connector body at the windowed portion. In another embodiment, the demarcation region includes an opening in the outer jacket that exposes the at least a portion of the windowed portion of the plurality of optical fibers and the optical fibers are adhered to a portion of the cable.

18 Claims, 10 Drawing Sheets

(56) References Cited

U.S. PATENT DOCUMENTS

| | | | |
|---|---|---|---|
| 2003/0155245 A1* | 8/2003 | Morioka | G01N 27/44782 |
| | | | 204/601 |
| 2004/0042731 A1 | 3/2004 | Hall | 385/59 |
| 2004/0052481 A1 | 3/2004 | Seguin et al. | 385/94 |
| 2007/0237461 A1 | 10/2007 | Schempp | 385/71 |
| 2008/0175542 A1* | 7/2008 | Lu et al. | 385/62 |
| 2009/0103870 A1* | 4/2009 | Solomon | G02B 6/3801 |
| | | | 385/98 |
| 2010/0158452 A1 | 6/2010 | Takahashi et al. | 385/96 |
| 2010/0220959 A1 | 9/2010 | Hoffmann et al. | 385/60 |
| 2011/0038582 A1 | 2/2011 | Defonzo et al. | |
| 2011/0081115 A1 | 4/2011 | Seng | 385/78 |
| 2011/0103752 A1* | 5/2011 | Little et al. | 385/93 |
| 2012/0014648 A1* | 1/2012 | Duis | G02B 6/3885 |
| | | | 385/52 |
| 2012/0033919 A1 | 2/2012 | Calac et al. | 385/76 |
| 2012/0281951 A1 | 11/2012 | Takahashi et al. | 385/80 |
| 2015/0132990 A1* | 5/2015 | Nong Chou | G02B 6/4266 |
| | | | 439/487 |

OTHER PUBLICATIONS

Written Opinion issued in corresponding PCT Appln. No. US/2014/010794, dated Apr. 24, 2014.
Ricker, "How Sony accidentally did the right thing with Light Peak", The Verge, article.
Patently Apple, "Apple introduces us to the Wild World of Coded Magnets", Celebrating Apple's Spirit of Invention, article.

\* cited by examiner

FIBER OPTIC CONNECTOR ASSEMBLIES HAVING WINDOWED OPTICAL FIBERS AND METHODS THEREOF

BACKGROUND

Field

The present disclosure generally relates to fiber optic connector assemblies for optical fiber cables and, more particularly, fiber optic connector assemblies having optical fibers with windowed portions exposing inner glass regions that are bonded to a demarcation body.

Technical Background

Fiber optic cables are an attractive alternative to bulky traditional conductor cables, especially as data rates increase. As the use of fiber optics migrates into numerous consumer electronics applications, such as connecting computer peripherals by the use of fiber optic cable assemblies, there will be a consumer driven expectation for cables having improved performance, compatibility with future communication protocols, and a broad range of use. For example, it is likely that consumer demand will be for an active fiber optic cable that is compatible with protocols such as universal serial bus specification version 3.0 (USB 3.0), Thunderbolt™, or the like.

Stresses on optical fibers within the fiber optic cable assembly may cause fatigue and damage to the optical fibers, as well as other components, within the fiber optic connector of the fiber optic cable assembly. Such stresses may also cause optical misalignment between the optical fibers and optical components within the connector, such as light emitting and receiving active components. For example, forces applied to the optical fibers may transfer to optical components within the fiber optic connector. Stresses may include tensile stresses due to external forces on the optical cable, as well as changes in length due to thermal coefficient of expansion effects.

Thus, there is an unresolved need for robust structures for securing optical fibers at or adjacent to a connector in an quick, easy and reliable manner.

SUMMARY

Embodiments of the present disclosure relate to fiber optic connectors of optical cable assemblies, such as active optical cable assemblies that convert optical signals into electrical signals, and electrical signals into optical signals. The embodiments described herein reduce stress on the optical fibers and optical components within a connector housing of the fiber optic connector by use of windowed portions formed in the optical fibers where a portion of an inner glass region is exposed. Glass, glass polymer (GGP) fibers are a type of optical fiber comprising a glass core surrounded by a glass cladding. One or more polymer layers, such as a polymer coating, is disposed about the inner glass region defined by the glass core and the glass cladding. However, such GGP fibers may be difficult to demark with strong retention in a connector body due to the tendency of the inner glass region to pull through the polymer layers under tension.

In some embodiments described herein, one or more optical fibers are disposed in a demarcation body, such as a connector housing or body, such that at least a portion of the windowed portions are aligned at a demarcation element of the demarcation body. An adhesive is bonded directly to the inner glass region of the optical fibers for adhering the optical fibers to the demarcation body. Because the inner glass regions of the optical fibers are bonded to the demarcation body, the inner glass region does not pull through the one or more polymer layers under tensile stress, thereby increasing the strength of retention. In other words, the adhesive is bonded to the inner glass region of the optical fiber so that the glass of the optical fiber can not slip relative to the coating under tensile stress or the like.

In this regard, in one embodiment, a fiber optic connector assembly includes an optical fiber having an inner glass region, a polymer layer surrounding the inner glass region, and a windowed portion, wherein the inner glass region is exposed at the windowed portion. The fiber optic connector assembly further includes a connector body having a demarcation region at a first end, wherein the optical fiber is disposed within the connector body such that at least a portion of the windowed portion of the optical fiber is positioned in the demarcation region, and the optical fiber is adhered to the connector body along a portion of the windowed portion.

In another embodiment, a fiber optic connector assembly includes an optical cable having a plurality of optical fibers within an outer jacket and a demarcation region. The demarcation region includes an opening in the outer jacket that exposes the plurality of optical fibers. The plurality of optical fibers is adhered to the outer jacket with each individual optical fiber of the plurality of optical fibers includes an inner glass region, a polymer region surrounding the inner glass region, and a windowed portion where the inner glass region is exposed at the windowed portion. The fiber optic connector assembly further includes a connector body coupled to the optical cable, wherein the plurality of optical fibers is disposed within the connector body.

In yet another embodiment, a method of assembling a fiber optic connector assembly includes stripping an end portion of an outer jacket of a fiber optic cable to expose at least one optical fiber, stripping one or more polymer layers of the at least one optical fiber to form a windowed portion on the at least one optical fiber such that an inner glass region is exposed at the windowed portion, positioning the at least one optical fiber into a connector body comprising a demarcation region such that at least a portion of the windowed portion of the at least one optical fiber is disposed proximate to the demarcation region, and applying an adhesive to the demarcation region to adhere the inner glass region of the windowed portion of the at least one optical fiber to the connector body. In further embodiments, the method may be used for a plurality of optical fibers of the fiber optic cable.

In yet another embodiment, a fiber optic connector assembly includes a plurality of optical fibers having a glass core, a glass cladding surrounding the glass core, a polymer coating surrounding the glass cladding, and a windowed portion. The polymer coating is removed and the glass cladding is exposed at the windowed portion of each optical fiber. The fiber optic connector assembly further includes a connector body having a demarcation region configured as an opening at a first end. The plurality of optical fibers is disposed within the connector body such that the windowed portion of each optical fiber is positioned at the demarcation region, and the plurality of optical fibers is adhered to the connector body at the windowed portion.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Some aspects of the present disclosure are directed to fiber optic connectors of optical cable assemblies. As an example and not a limitation, embodiments described herein may be incorporated into active optical cables that convert electrical signals into optical signals for optical transmission over the optical cable, and optical signals into electrical signals for transmission to a coupled electronic device. In fiber optic connector applications, the connector housing acts as a demarcation body to which the plurality of optical fibers within an optical cable are secured. Embodiments described herein may provide increased mechanical robustness of fiber optic connectors by use of one or more windowed regions in each of the optical fibers that are coupled to the demarcation body. The inner glass region of the optical fibers is exposed at the windowed region such that the adhesive that secures the optical fibers to the demarcation body adheres to the glass region of the optical fibers. The adhesion of the glass portions of the optical fibers, rather than the outer polymer layers, to the demarcation body may provide stronger retention due to the tendency of the inner glass region to pull through the outer polymer layers under tension.

Due to the high data rates of current communication protocols, the cable length of reasonably sized traditional passive electrical conductor cable assemblies is limited to about 3 meters or less due to skin and dielectric losses intrinsic to electrical conductors and dielectric materials. Further, conductor cables that are compatible with high-speed protocols are very bulky and put stress on the small connectors that are used on laptops and consumer devices such as camcorders, smart phones, and media players. Because of these limitations, there may be interest in a fiber optic cable for use with existing and future communication protocols, such as USB 3.0 and Thunderbolt. A fiber optic cable may be dramatically thinner, more flexible, easier to carry for portable use, and may put much less stress on the connectors used in small, handheld devices. Additionally, a fiber optic cable assembly may comprise cable lengths of 100 meter spans, allowing long, high-speed cables to be used in markets such as video delivery and thin-client computing.

Although the embodiments are described herein in the context of active optical cables, the concepts are not limited thereto and may be used with any suitable fiber optic connector assembly. The demarcation approaches described herein may be utilized in any application in which optical fiber retention is desirable. For example, the demarcation approaches may be utilized in industry standard optical connectors such as LC connectors, SC connectors, MTP connectors, MPO connectors, and the like.

Figure 1:
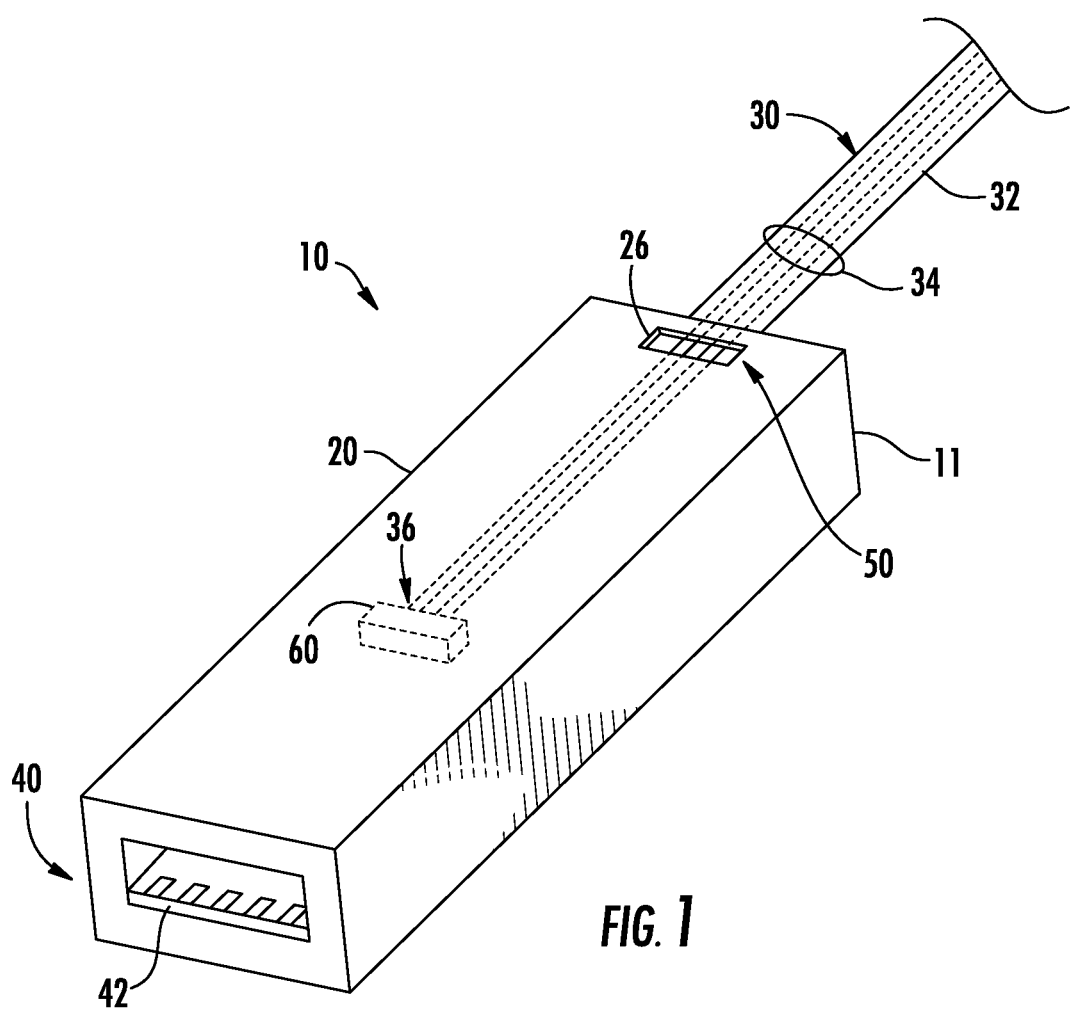
FIG. 1 schematically depicts a fiber optic connector assembly having a plurality of optical fibers that include a windowed portion that are secured to a demarcation region within a connector body.

In this regard, FIG. 1 depicts a fiber optic connector assembly 10 of an active optical cable assembly. It should be understood that only one fiber optic connector assembly 10 is depicted in FIG. 1, and that the active optical cable assembly may include a second fiber optic connector assembly at an opposite end. The fiber optic connector assembly 10 generally comprises a connector body 20, which may be defined by one or more components, such as a connector housing and an overmold, an electrical connector 40, which may be defined by a plug portion extending from the connector body 20, and an optical cable 30 including one or more optical fibers 34 maintained within an outer jacket 32. The electrical connector 40 comprises a plurality of electrical conductors 42 that are configured to electrically mate with a corresponding electrical connector, such as a receptacle of an electronic device.

The fiber optic connector assembly 10 may be configured according to any existing or yet-to-be developed connector standard. As nonlimiting examples, the fiber optic connector assembly 10 may be configured according to the USB standard, the Thunderbolt™ standard, the FireWire standard, and the like.

As shown in FIG. 1, optical fibers 34 (or a single fiber in some embodiments) enter the connector body 20 at a first end 11. The connector body 20 acts as a demarcation body to which the optical fibers are secured. The optical fibers 34 have an inner glass region, including a glass core, and at least one outer polymer layer. As described in more detail below, each optical fiber 34 has a windowed portion 50 where the polymer layer is stripped away or otherwise removed to expose the inner glass region. The connector body 20, which may be defined by one or more components (e.g., a connector housing, a connector overmold, a strain relief, and the like), includes a demarcation region 26. In the illustrated embodiment, the demarcation region 26 is configured as an opening in the connector body 20 into which at least a portion of the windowed portions 50 of the optical fibers are aligned.

The optical fibers 34 are secured to the connector body 20 by the deposition of adhesive, such as a UV curable adhesive, for example, into the demarcation region 26 such that the adhesive contacts the inner glass region of the optical fibers 34 at the widowed portion 50. In this manner, the adhesive adheres to the inner glass region to adhere the optical fibers together and/or to the connector body 20, which provides for robust optical fiber retention and prevention of optical fiber ingress or egress under optical cable 30 tension (i.e., pistoning of the optical fibers).

The optical fibers traverse a length of the connector body 20 such that the fiber ends 36 are affixed at a termination location 60 within the connector body 20. The fiber ends 36 may terminate at an optical component, such as a ferrule element, a lens assembly (e.g., a total internal reflection element), an active component (e.g., a light emitting diode, a laser diode, a photodiode, and the like), or combinations thereof. Securing the optical fibers 34 at the demarcation region 26 may prevent forces from being transferred to the termination location 60 and one or more optical components.

Figure 2:
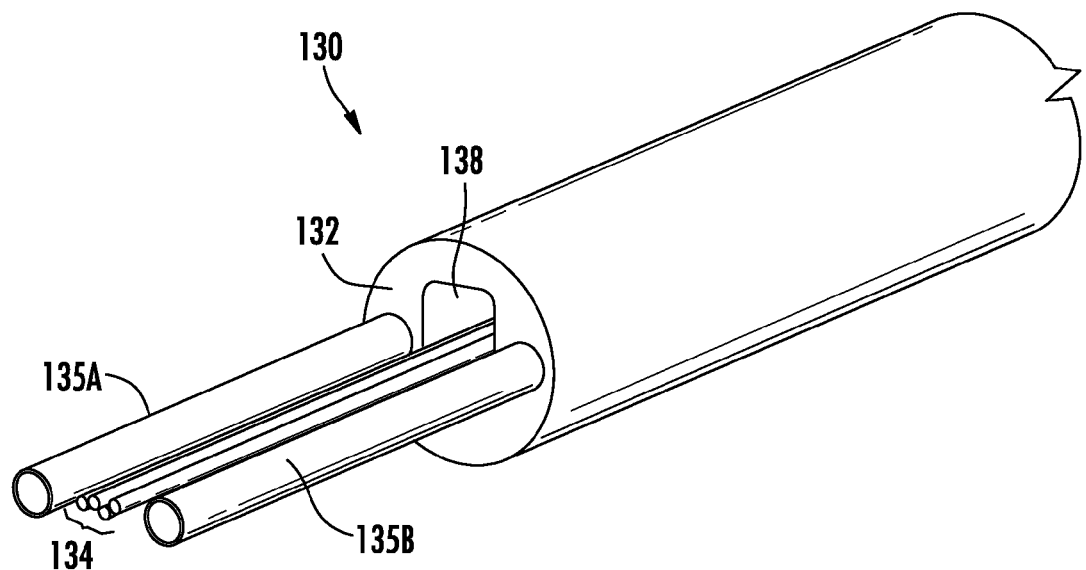
FIG. 2 is a partial cutaway view of an optical cable of the optical cable assembly.

Referring now to FIG. 2, one non-limiting example of an optical cable 130 is illustrated with internal components exposed. The optical cable 30 depicted in FIG. 1 may be configured as the optical cable 130 depicted in FIG. 2. It should be understood that other optical cable configurations may be utilized, and the optical cable 130 depicted in FIG. 2 is used merely as an example. The optical cable 130 includes a polymer jacket 132 having an outer periphery and an inner periphery, with the inner periphery defining a slot 138. The slot 138 acts as an optical fiber envelope. The polymer jacket 132 may surround the slot 138 and the slot 138 may extend the entire length of the optical cable 130.

Data-carrying buffered optical fibers 134 are disposed within the slot 138 of the optical cable 130. The optical fibers 134 may be configured to pass optical signals back and forth along the optical cable 130. Any number of optical fibers 134 may be included in the slot 138. The optical fibers 134 are free to translate within the slot 138 when the optical cable 130 is bent. The shape of the slot 138 may be established so that no matter how the optical cable 130 is bent, the optical fibers 134 will never be bent below their minimum bend radius. Although the slot 138 is illustrated as rectangular, the shape and orientation of the slot 138 may also depend on the preferred bending and locations of other elements within the optical cable 130.

In some embodiments, particularly optical cable assemblies configured as a hybrid optical cable capable of providing electrical power, one or more conductors may be disposed within the optical cable 130. For example, the conductors may be disposed within the slot 138 and span the entire length of the optical cable 130 (not shown). In other embodiments, the conductors may be arranged within the polymer jacket 132 (e.g., the first and second strength members 135A, 135B described below).

In the illustrated embodiment, the optical cable 130 further includes a first strength element 135A and a second strength element 135B disposed within the polymer jacket 132 to provide increased rigidity to the optical cable 130, and prevent the optical fibers 134 from bending below their minimum bend radius. More or fewer strength elements may be utilized. The first and second strength members 135A, 135B may be any suitable material, such as, but not limited to, stranded stainless steel, copper, and aramid fibers (e.g., Kevlar, fiberglass, and the like). In some embodiments, the first strength element 135A and the second strength element 135B are electrically conductive and act as the electrical conductors described above to provide electrical power and/or data across the optical cable 130. The first and second strength elements 135A, 135B may also be used to secure the optical cable 130 to a cable attachment member (not shown) of the connector body 20. For example the first and second strength elements 135A, 135B may be coupled to mechanical features within the cable attachment member.

Figure 3:
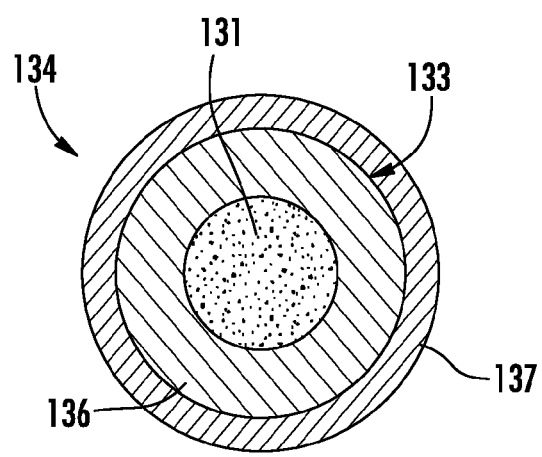
FIG. 3 is a cross sectional view of an optical fiber having a glass core, a glass cladding, and a polymer layer.

Referring now to FIG. 3, a cross sectional view of an exemplary optical fiber 134 is illustrated, which is similar to optical fiber 34. It should be understood that the optical fiber 134 illustrated in FIG. 3 is for illustrative purposes only, and that other optical fiber configurations including more or fewer layers may be used. The illustrated optical fiber is configured as a glass, glass polymer (GGP) optical fiber having a glass core 131 extending the length of the optical fiber 134, and a glass cladding 136 surrounding the glass core 131, that are drawn from a glass preform. The refractive index of the of the glass core 131 should be greater than the refractive index of the glass cladding 136. The GGP optical fiber 134 further includes at least one polymer layer 137 surrounding the glass cladding 136. The polymer layer 137 may be configured as a polymer coating applied to the glass cladding. It should be understood that additional polymer layers and a buffer layer may also be used on the optical fiber.

Figure 4:
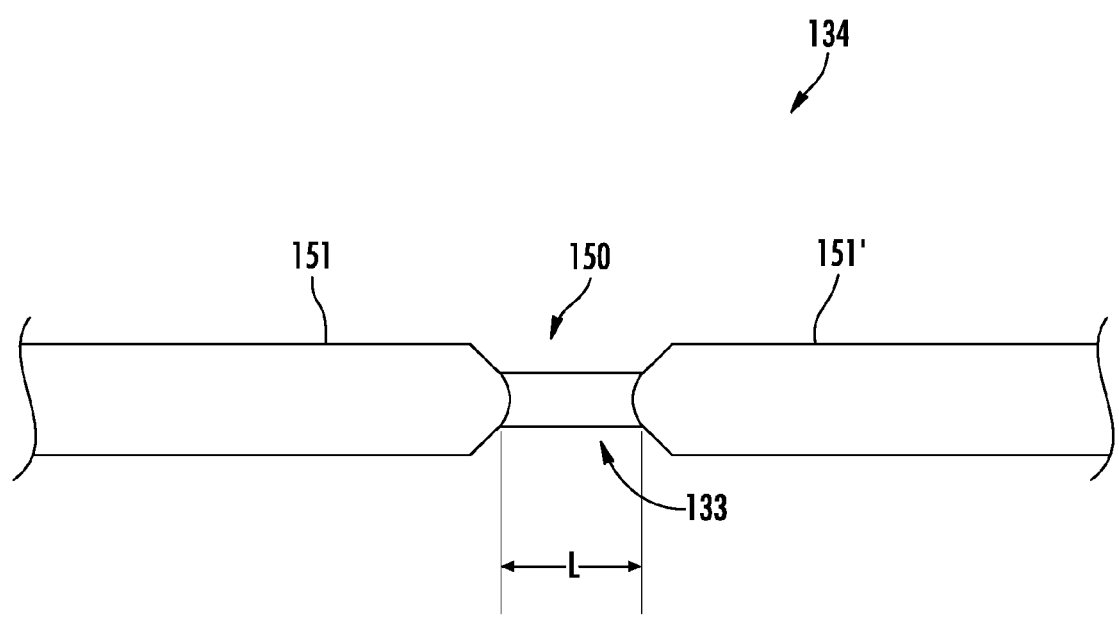
FIG. 4 is a schematic perspective view of a windowed portion of an optical fiber.

FIG. 4 depicts a close up view of a windowed portion 150 of an optical fiber 134. The windowed portion 150 includes a stripped region of the optical fiber 134 where the polymer layer 137 and any other additional outer layers are stripped away from the optical fiber 134, thereby exposing the inner glass region 133 (either the glass gladding 136 or the glass core 131). The exposed inner glass region 133 of the windowed portion 150 is located between a first unstripped region 151 and a second unstripped region 151' that still have the polymer layer 137 and any other outer layers (i.e., a buffer layer). The windowed portion 150 has a length L that may depend on the area of the demarcation body (e.g., at the demarcation region 26 shown in FIG. 1) in which the optical cable is to be secured by adhesive.

Figure 5:
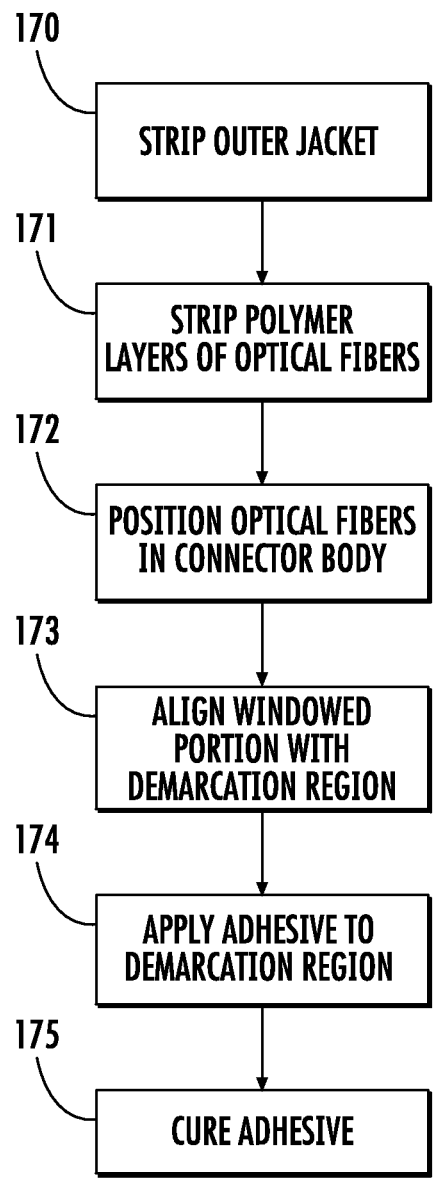
FIG. 5 is a flow chart of a process for assembling optical fibers into a fiber optic connector assembly.

Referring now to FIG. 5, a flow chart illustrating an exemplary process of preparing windowed regions in optical fibers and securing the windowed regions of the optical fibers to a demarcation body, such as a fiber optic connector body. At block 170, an optical cable 130 is obtained and the polymer jacket 132 is split or removed to reveal the optical fibers 134 disposed therein (see FIG. 2). The strength members, 135A, 135B, if present, may be bent away from the optical fibers 134 or trimmed back to provide better access to the optical fibers. At block 171, the polymer layer(s) 137 is/are stripped away from inner glass region 133 to form the windowed portion 150, such as the windowed portion depicted in FIG. 4. The stripping or widowing process may be of any process capable of removing the one or more polymer layers. As nonlimiting examples, the one or more polymer layers may be removed by a laser stripping process, a hot gas process, or a mechanical process. As an example and not a limitation, the stripping process may remove one or more polymer layers (e.g., about 250 µm in diameter) down to the inner glass region (e.g., about 100 µm in diameter). The length L of the windowed portion 150 may depend on the particular application. In one active optical cable embodiment, the windowed portion 150 has a length L of about 2 mm. Other lengths may be used.

At blocks 172 and 173, the optical fibers 134 are positioned within a demarcation body, such as a connector body 20, such that the windowed portions 150 of the optical fibers 134 are aligned with a demarcation region 26 of the demarcation body. In the example provided in FIG. 1, the demarcation region 26 is configured as an opening in the connector body 20. After the windowed portions 150 are properly positioned in the connector body 20, adhesive is applied to the demarcation region 26 at block 174 such that it directly contacts the inner glass region 133 of the windowed portions 150 of the optical fibers 134. In the example provided in FIG. 1, the adhesive is applied into the opening of the demarcation region 26. In some embodiments, the optical fibers 134 are bundled together. In other embodiments, the optical fibers 134 are separated. The type of adhesive used may depend on the particular application. For example, a low viscosity adhesive may be used if filling and wicking is desired. Conversely, an adhesive with a higher viscosity may be used to limit wicking. An elastomeric adhesive may be used in some embodiments to provide for shock and vibration resistance at the demarcation region 26, as well as to provide flexibility to the demarcation region.

At block 175, the adhesive is cured within the demarcation region 26 such that the inner glass region 133 is directly bonded to the demarcation body (e.g., the connector body 20). In some embodiments, the adhesive may be cured by UV curing. After the adhesive is cured, the optical fibers 134 are secured to the connector body 20 and addition connector assembly processes may be completed.

Figure 6A:
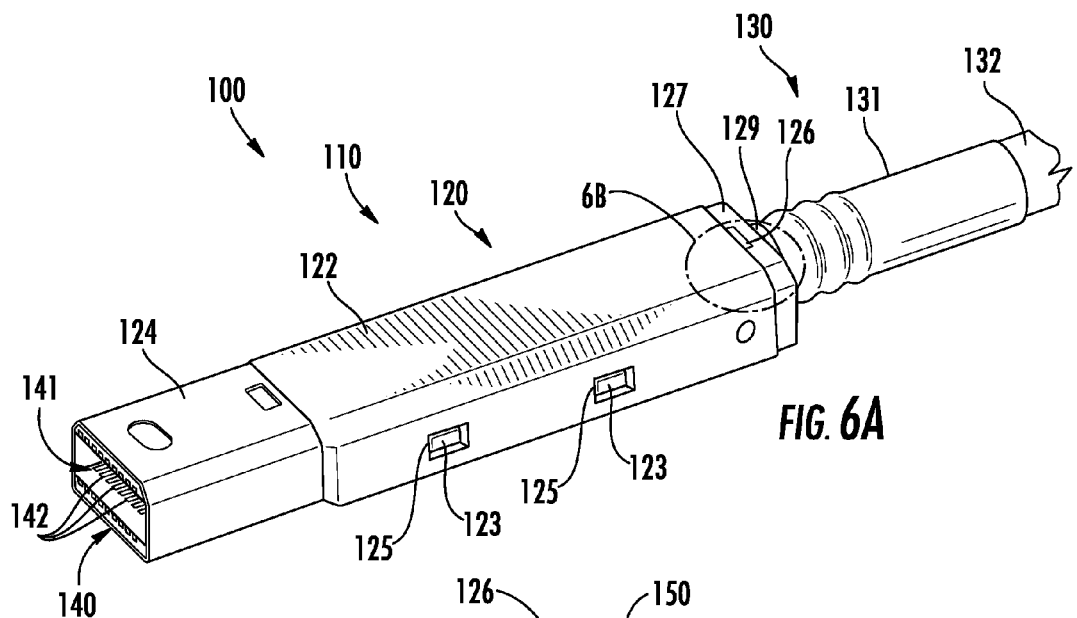
FIG. 6A is a perspective view of a fiber optic connector assembly having a demarcation region.

In FIG. 6A, an active optic cable assembly 100 having a fiber optic connector assembly 110 configured as a Thunderbolt™ active optical connector is illustrated. However, the fiber optic connector assembly 110 may be configured to be compatible with other connector standards, such as USB 3.0, FireWire, and the like. The fiber optic connector assembly 110 is coupled to an end of an optical cable 130 having a plurality of optical fibers 134 (see FIG. 2). Although not shown in FIG. 6A, it should be understood that a second fiber optic connector assembly may be coupled to a second end of the optical cable 130.

The fiber optic connector assembly 110 comprises a connector housing 120 defined by a first connector housing half 122 and a second connector housing half 124. In other embodiments, the connector housing 120 may be configured as a unitary component. The connector housing 120 may define a connector body that further includes an overmold portion (not shown in FIG. 6A). In the illustrated embodiment, the first connector housing half 122 and the second connector housing half 124 are mechanically coupled together by male engagement features 123 on the second connector housing half 124 that engage female engagement features 125 on the first connector housing half 122. Other engagement features may be utilized to couple the connector housing halves.

The fiber optic connector assembly 110 includes an electrical connector 140 that is configured to mate with a corresponding receptacle connector. The receptacle connector may be present on an electronic device, such as, without limitation, a personal computer, a server computing device, a smart phone, a portable media player, a display device, a portable electronic storage device, and the like. The receptacle connector may also be present on another active optical cable assembly to couple two or more active optic cable assemblies together. The electrical connector 140 of the illustrated embodiment comprises an opening 141 that exposes a plurality of electrical contacts 142. The electrical contacts 142 are positioned and configured to be electrically coupled to the electrical contacts of the corresponding receptacle connector to pass electrical signals and/or power between the fiber optic connector assembly 110 and the electronic device associated with the receptacle connector. Although not shown in FIG. 6A, the fiber optic connector assembly 110 includes a transceiver circuit having active components that convert electrical signals received at the electrical connector 140 into optical signals for propagation over the optical fibers 134 of the cable assembly, and convert optical signals received over the optical fibers 134 into electrical signals for transmission over the electrical contacts 142.

The optical cable 130 is coupled to the connector housing 120 by a cable attachment member 127 and a strain relief element 129 in the illustrated embodiment. The cable attachment member 127, which is disposed within the connector housing 120, mechanically couples the optical cable 130 to the connector housing 120, and the strain relief element 129 alleviates stress on the optical cable 130 near the attachment of the optical cable to the connector housing 120. In some embodiments, the cable attachment member 127 and the strain relief element 129 may be configured as a single, unitary component. In other embodiments, the cable attachment member 127 and the strain relief element 129 may be configured as separate components. In yet other embodiments, the strain relief element 129 may not be included. It should be understood that other optical cable attachment structures and configurations may be utilized.

Figure 6B:
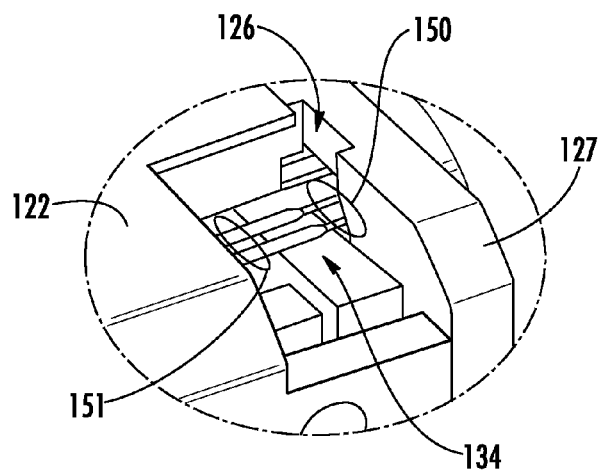
FIG. 6B is a close-up, partial cutaway view of the demarcation region of the fiber optic connector assembly depicted in FIG. 6A.
Figure 6C:
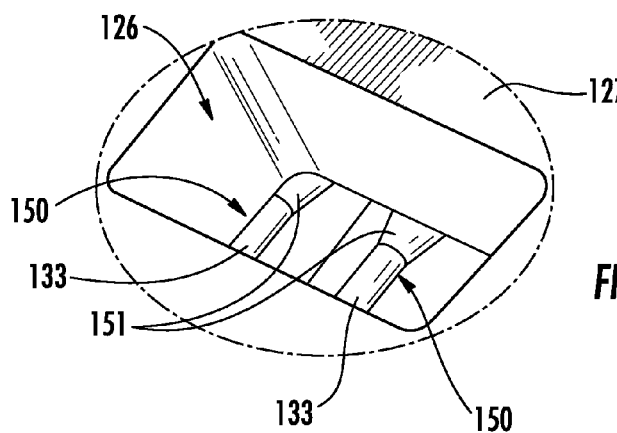
FIG. 6C is a close-up view of the demarcation region of the fiber optic connector assembly depicted in FIG. 6A.

The connector body includes a demarcation region 126 configured as a slot opening in the cable attachment member 127. Openings other than slot openings may be used. In other embodiments, the demarcation region 126 may be configured as an opening in the connector housing 120 (e.g., first half connector housing 122). FIG. 6B is a close-up, partial cutaway view of the demarcation region 126 depicted in FIG. 6A, and FIG. 6B is a close-up view of the same demarcation region 126 within the cable attachment member 127. The demarcation region 126 provides access to the windowed portions 150 of the optical fibers 134 within the cable attachment member 127. As described above, the windowed portions 150 expose the inner glass region 133 of the optical fibers 134, and are positioned between unstripped portions 151 that retain the one or more polymer layers. The adhesive may be applied to the demarcation region 126 to bond directly to the inner glass region 133 of the optical fibers 134, as described above. Thus, the optical fibers 134 may be bonded to the cable attachment member 127 and therefore the connector body at the inner glass region 133.

Figure 7A:
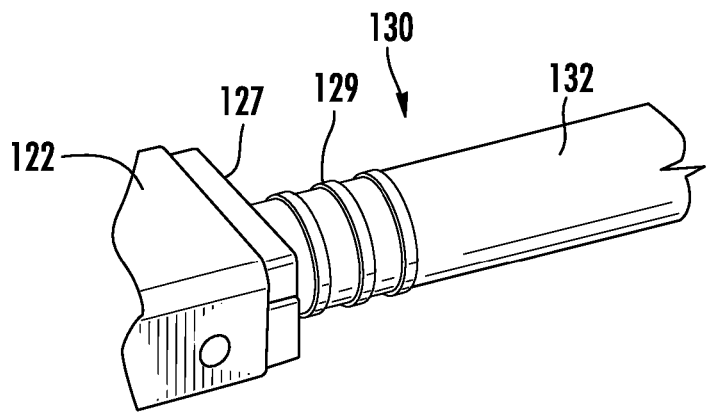
FIG. 7A is a close-up view of an optical cable of an optical cable assembly before the formation of a demarcation region in the optical cable.
Figure 7B:
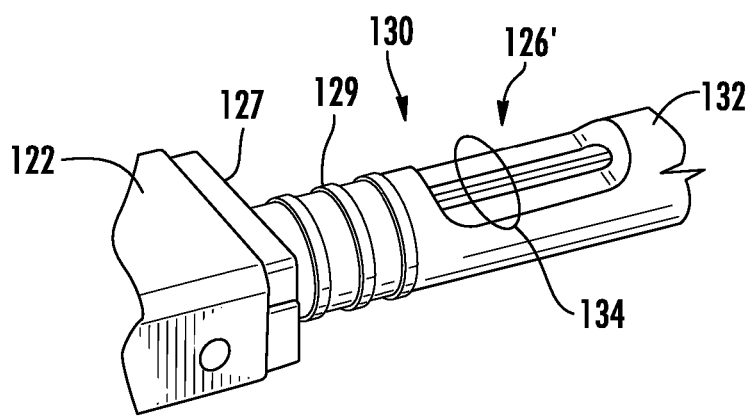
FIG. 7B is a close-up view of the optical cable depicted in FIG. 7A after the formation of a demarcation region.
Figure 7C:
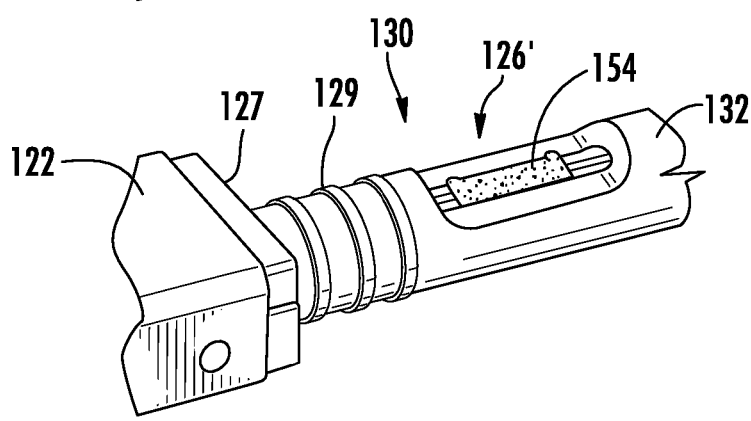
FIG. 7C is a close-up view of the optical cable depicted in FIG. 7B with adhesive applied to the demarcation region.
Figure 7D:
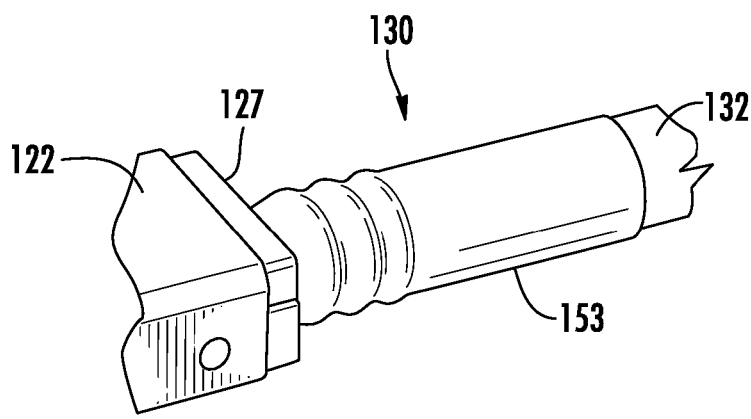
FIG. 7D is a close-up view of the optical cable depicted in FIG. 7C with a heat shrink wrap applied to the demarcation region.

FIGS. 7A-7C depict a fabrication process of an alternative embodiment in which a demarcation region 126' is positioned in the jacket of the optical cable near the cable attachment member 127 of the fiber optic connector assembly 110. FIG. 7A shows an optical cable 130 before formation of the demarcation region 126' in the polymer jacket 132. In FIG. 7B, an opening has been formed within the polymer jacket 132 as the demarcation region 126' to expose the optical fibers 134. In some embodiments, the optical fibers 134 include a windowed portion 150, as described above. In other embodiments, the optical fibers 134 do not include a windowed portion 150. As shown in FIG. 7C, an adhesive 154 is applied to the opening in the polymer jacket 132 that defines the demarcation region 126'. The adhesive 154 secures the optical fibers 134 to the polymer jacket 132 proximate the fiber optic connector strain relief element 129 of the fiber optic connector assembly 110. A protective heat shrink wrap 153 may then be applied around the demarcation region 126' as shown in FIG. 7D.

Figure 8:
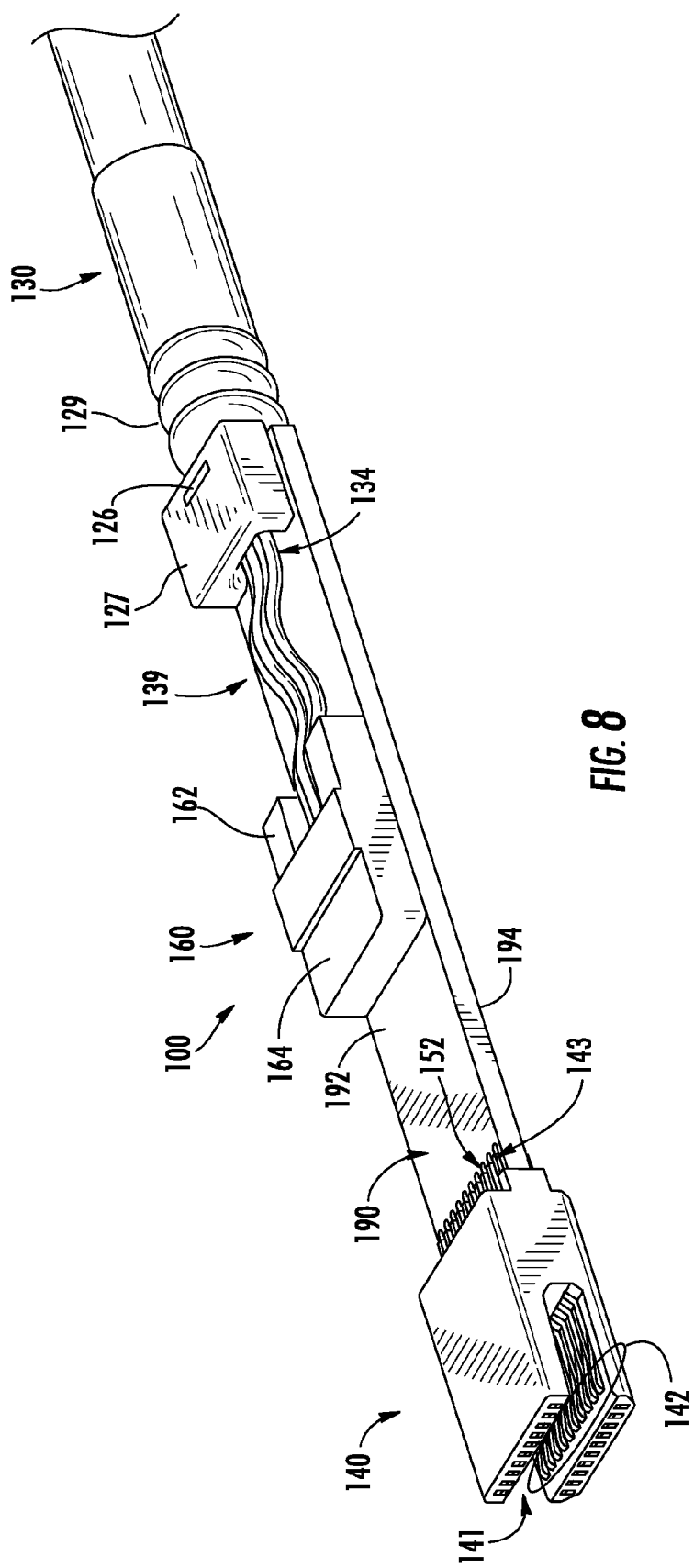
FIG. 8 is a perspective view of a fiber optic connector assembly with the connector housing removed and excess optical fiber arranged in a fiber bend.

FIG. 8 is a perspective view of the fiber optic connector assembly 110 depicted in FIG. 6A with the first and second connector housing halves 122, 124 removed to reveal exemplary internal components within the connector. The fiber optic connector assembly 110 includes a substrate 190, such as a printed circuit board (e.g., FR4), having a first surface 192 and a second surface 194. The substrate 190 supports a plurality of electrical and optical components, as well as conductive traces and vias to provide electrical power and route electronic signals. It should be understood that only selected electrical and optical components are depicted in FIG. 8, and that additional components may be included.

The first surface 192 of the substrate 190 supports a ferrule element 162 and a total internal reflection module 164. The total internal reflection module 164 is used to couple the optical fibers 134 to active components within the connector housing 120. As shown in the figures, the ferrule element 162 and the total internal reflection module 164 may be configured as a single optical coupling component 160. In other embodiments, the ferrule element 162 and the total internal reflection module 164 may be separate components. In yet other embodiments, the ferrule element 162 and/or the total internal reflection module 164 may not be included. For example, the optical fibers may be directly coupled to optical components, such as lenses, light emitting diodes, laser diodes, photodiodes, and the like.

The first and second surfaces 192, 194 of the substrate also include conductive pads 152 to which electrical conductors 143 of the electrical connector are electrically coupled (e.g., by soldering). In this manner, electrical signals are passed from the electrical contacts 142 of the electrical to conductive traces on the substrate 190 by way of electrical interface provided by the electrical conductors 143 and the conductive pads 152.

The ferrule element 162 may be configured to provide the function of routing the optical fibers 134 into a proper orientation to be received by the total internal reflection module 164. For example, the ferrule element 162 may position the optical fibers 134 to one side of the substrate 190 so that they avoid particular components mounted on the second surface 194. In some embodiments, the optical fibers 134 are bonded together by a soft compound to reduce routing impact and lessen the effects of vibration and shock due to external forces. The ferrule element 162 may include internal features to position fiber ends of the optical fiber to a proper location with respect to the total internal reflection module 164, as described below with reference to FIG. 9. The ferrule element 162 may also provide the function of securing the optical fibers 134 within the connector housing 120. To isolate stress applied to the optical fibers 134 from transferring to the fiber ends and optical components of the fiber optic connector assembly 110 (e.g., the total internal reflection module 164), excess fiber may be provided within the connector housing 120 in the form of a fiber bend 139. Changes in length of the optical fibers due to tension on the optical fibers, or due to the coefficient of thermal expansion effects, may be taken up by the fiber bend 139.

Figure 9:
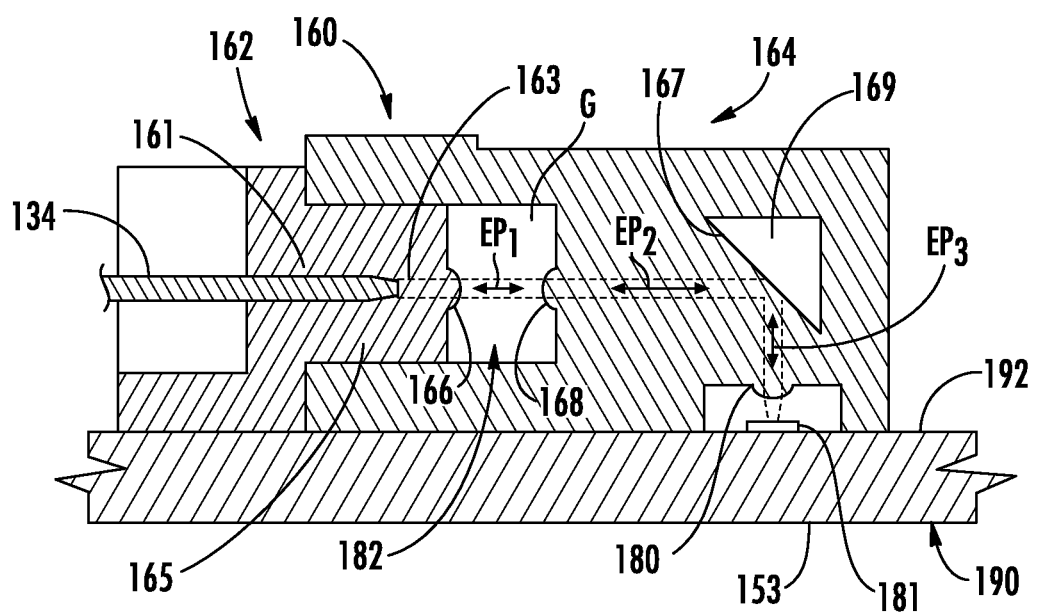
FIG. 9 is a cross sectional view of an optical coupling component within the fiber optic connector assembly depicted in FIG. 8.

Referring now to FIG. 9, a cross sectional side view of the optical coupling component 160 depicted in FIG. 8 is provided. The optical coupling component 160 may be configured as any component capable of securing the optical fibers 134 and ensuring that the optical signals are passed between active components 181 and the optical fibers 134. It should be understood that embodiments of the present disclosure are not limited to the optical module depicted in FIG. 9. The illustrated ferrule element 162 has a mating portion 165 that is configured to be disposed within a receptacle 182 defined by the total internal reflection module 164 such that a gap G is present between the mating portion 165 and the total internal reflection module 164. Internal bores 161 extend within the mating portion 165 into which the optical fibers 134 are disposed. The optical fibers 134 are secured within the internal bores 161 (e.g., by an adhesive) such that the fiber ends terminate and are secured at a termination location 163 within the internal bores 161. A coupling face of the mating portion 165 includes a lens element 166 at the gap G.

The total internal reflection module 164 includes a lens 168 at the gap G to transmit and receive optical signals to and from the gap G. The total internal reflection module 164 further includes a total internal reflection surface 167 and a free space region 169 to reflect optical signals to and from the optical fibers 134. For example, an optical signal may propagate within the mating portion 165 of the ferrule element and pass into the gap G through lens element 166 as emission path EP1. The optical signal is then received by lens element 168 such that it propagates toward the total internal reflection surface 167 within the optically transmissive material of the total internal reflection module 164 as emission path EP2. The optical signal is then reflected off the total internal reflective surface 167 as emission path EP3 by total internal reflection due to the change of the index of refraction between the material of the total internal reflection module 164 and the air within the free space region 169. The optical signal then passes through a lens element 180 and is received by a receiving active component 181 (e.g., a photodiode). Similarly, optical signals emitted by a transmitting active component 181 (e.g., a laser diode such as a vertical-external-cavity surface-emitting-laser (VECSEL)) passes into the optically transmissive total internal reflection module 164 through lens element 180 as emission path EP3, is redirected by the angled total internal reflection surface 167 as emission path EP2, passes through lens element 168 and into the gap G as emission path EP1. The optical signal then passes through lens element 166 into the ferrule element 162 where it is then received by one of the optical fibers 134. The active components 181 may be coupled to the substrate 190 directly, or be provided on a separate daughter board that is then electrically coupled to the substrate 190 (e.g., by a flex circuit).

It should be understood that the optical coupling component 160 depicted in FIG. 9 is for exemplary purposes only, and that other optical coupling arrangements may be utilized. For example, in some embodiments the optical fibers may be secured within the connector housing 120 and coupled to active components by butt coupling methods.

Figure 10:
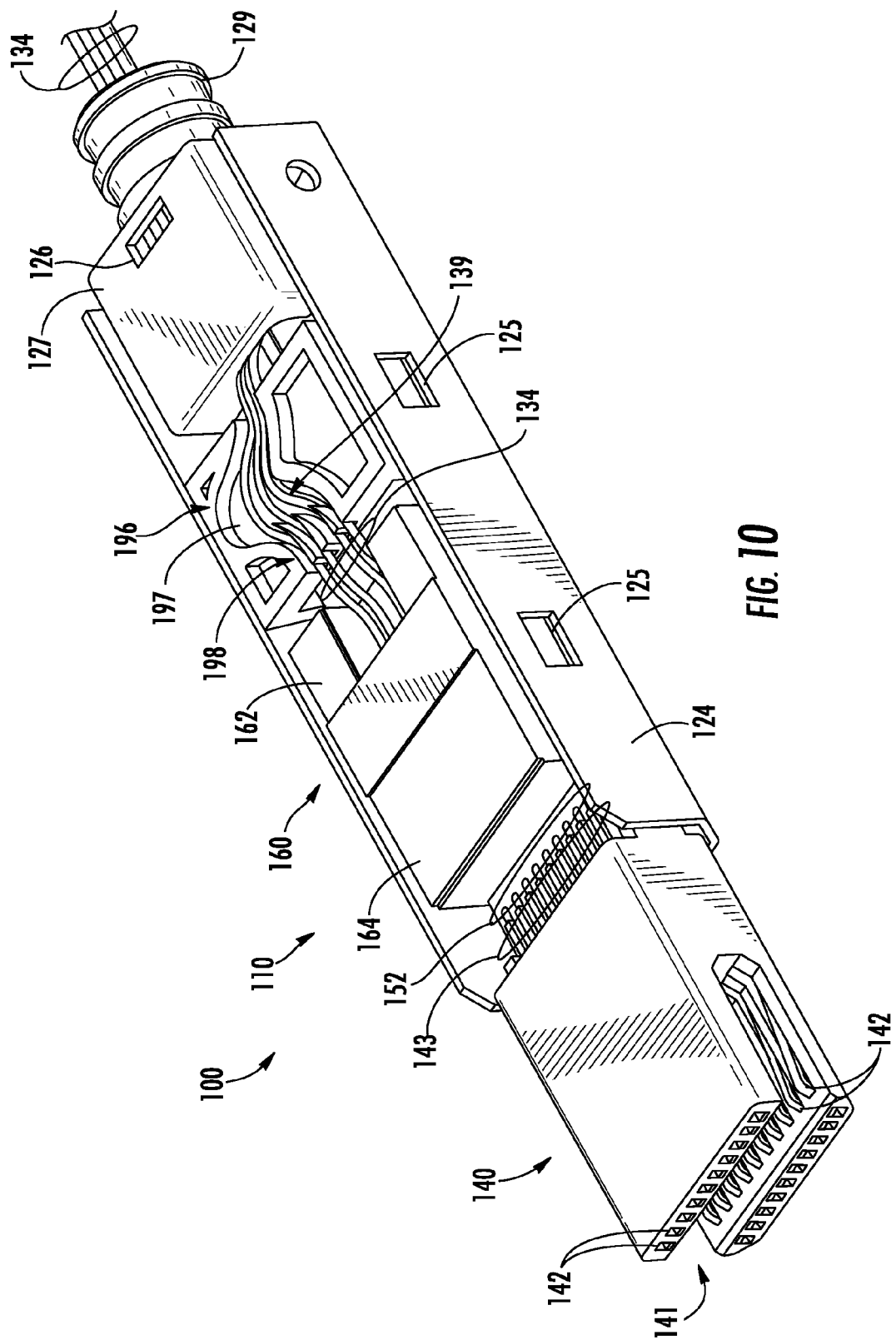
FIGS. 10 and 11 are perspective views of a fiber optic connector assembly including an optical coupling component having a fiber guide portion into which a plurality of optical fibers are disposed.
Figure 11:
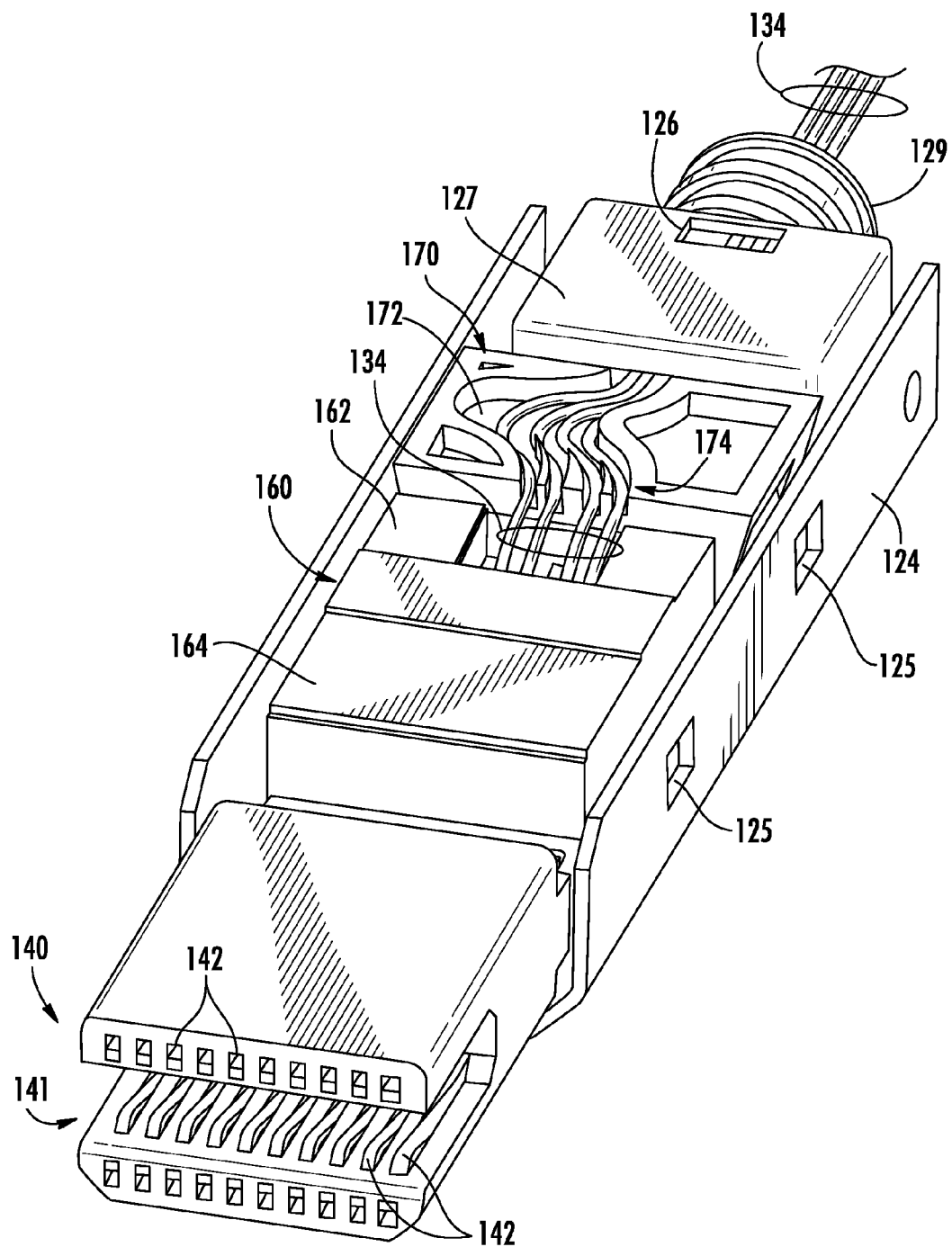

FIGS. 10 and 11 depict another variation of the fiber optic connector assembly 110 as shown in FIG. 7, but with a fiber guide component 196 containing curved grooves 197/198 in which the fiber bend 139 portion of the optical fibers 134 is disposed. In the illustrated embodiment, the fiber guide component 196 includes a first curved groove 197 in which all of the optical fibers 134 are disposed, and several second curved grooves 198 sized to accept a single optical fiber 134. The second curved grooves 198 position the optical fibers 134 in a proper orientation prior to extending into the ferrule element 162. The fiber guide component 196 may be coupled to the substrate 190, and be made of any appropriately rigid material. As described above with respect to the fiber bend 139 in FIG. 8, stress applied to the optical fibers 134 is prevented from being transferred to the fiber ends and optical components of the fiber optic connector assembly 110 (e.g., the total internal reflection module 164) by the excess fiber within the fiber guide component 196. Changes in length of the optical fibers 134 due to tension on the optical fibers 134, or due to the coefficient of thermal expansion effects, may be taken up by the fiber bend 139.

It is noted that terms like "typically," when utilized herein, are not intended to limit the scope of the claims or to imply that certain features are critical, essential, or even important to the structure or function of the device. Rather, these terms are merely intended to highlight alternative or additional features that may or may not be utilized in a particular embodiment.

For the purposes of describing and defining the concepts it is noted that the terms "substantially," "approximately" and "about" are utilized herein to represent the inherent degree of uncertainty that may be attributed to any quantitative comparison, value, measurement, or other representation.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A fiber optic connector assembly comprising:
an optical fiber comprising an inner glass region, a polymer layer surrounding the inner glass region, a first unstripped region, a second unstripped region, and a windowed portion, wherein the inner glass region is exposed at the windowed portion and the windowed portion is positioned between the first unstripped region and the second unstripped region; and
a connector body comprising:
a connector housing coupled to a strain relief element; and
a demarcation region comprising a slot opening in the strain relief element, wherein the optical fiber is disposed within the strain relief element and the connector body such that the windowed portion of the optical fiber is positioned in the demarcation region, and the optical fiber is adhered to the connector body along a portion of the windowed portion.

2. The fiber optic connector assembly of claim 1, wherein the optical fiber is adhered to the connector body at the windowed portion with a UV curable adhesive.

3. The fiber optic connector assembly of claim 1, wherein the optical fiber is adhered to the connector body at the windowed portion with an elastomeric adhesive.

4. The fiber optic connector assembly of claim 1, wherein the inner glass region comprises a glass core and a glass cladding surrounding the glass core.

5. The fiber optic connector assembly of claim 4, wherein the polymer layer comprises a polymer coating on the glass cladding.

6. The fiber optic connector assembly of claim 5, wherein the polymer coating is removed at the windowed portion.

7. The fiber optic connector assembly of claim 1, wherein the polymer layer is removed by a laser process.

8. The fiber optic connector assembly of claim 1, further comprising an electrical connector disposed within the connector body at an end opposite from the first end.

9. The fiber optic connector assembly of claim 1, wherein:
the optical fiber comprises a fiber end; and
the fiber end is secured within the connector body at a termination location such that excess optical fiber is present between the demarcation region and the termination location.

10. The fiber optic connector assembly of claim 9, further comprising a fiber guide component comprising a curved groove, wherein the optical fiber is disposed within the curved groove.

11. The fiber optic connector assembly of claim 9, wherein the optical fiber has a bend within the connector body between the demarcation region and the termination location.

12. A fiber optic connector assembly comprising:
an optical cable comprising a plurality of optical fibers within an outer jacket, wherein each individual optical fiber of the plurality of optical fibers comprises an inner glass region, a polymer layer surrounding the inner glass region, a first unstripped region, a second unstripped region, and a windowed portion where the inner glass region is exposed at the windowed portion and the windowed portion is positioned between the first unstripped region and the second unstripped region; and
a connector body comprising:
a connector housing coupled to a strain relief element; and
a demarcation region comprising a slot opening in the strain relief element, wherein the plurality of optical fiber is disposed within the strain relief element and the connector body such that the windowed portions of the plurality of optical fibers is positioned in the demarcation region, and the optical fiber is adhered to the connector body along a portion of the windowed portion.

13. The fiber optic connector assembly of claim 12, wherein the plurality of optical fibers is adhered to the outer jacket by a UV curable adhesive at the windowed portion.

14. The fiber optic connector assembly of claim 12, wherein the inner glass region comprises a glass core and a glass cladding surrounding the glass core.

15. The fiber optic connector assembly of claim 12, wherein the polymer layer comprises a polymer coating on the glass cladding.

16. The fiber optic connector assembly of claim 15, wherein the polymer coating is removed at the windowed portion.

17. The fiber optic connector assembly of claim 16, wherein the polymer layer is removed by a laser process.

18. The fiber optic connector assembly of claim 12, further comprising a heat shrink wrap disposed around the demarcation region.

* * * * *